US006253130B1

(12) United States Patent
Mergenthaler et al.

(10) Patent No.: US 6,253,130 B1
(45) Date of Patent: Jun. 26, 2001

(54) METHOD AND DEVICE FOR MONITORING SENSORS IN A VEHICLE

(75) Inventors: Rolf-Hermann Mergenthaler, Leonberg; Werner Urban, Vaihingen/Enz, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,249

(22) PCT Filed: May 9, 1998

(86) PCT No.: PCT/DE98/01292

§ 371 Date: Dec. 8, 1999

§ 102(e) Date: Dec. 8, 1999

(87) PCT Pub. No.: WO99/01718

PCT Pub. Date: Jan. 14, 1999

(30) Foreign Application Priority Data

Jul. 2, 1997 (DE) .............................................. 197 28 094
Nov. 4, 1997 (DE) .............................................. 197 48 596

(51) Int. Cl.[7] .............................. G06F 7/00; G06F 19/00
(52) U.S. Cl. .............................. 701/34; 701/74; 303/146; 303/147
(58) Field of Search .................................. 701/34, 41, 72, 701/74, 75, 78, 80, 83; 303/146, 147, 148, 149

(56) References Cited

U.S. PATENT DOCUMENTS

| 5,140,524 | 8/1992 | Matsuda . | |
|---|---|---|---|
| 5,790,970 | * 8/1998 | Brachert et al. | 701/70 |
| 5,809,444 | * 9/1998 | Hadeler et al. | 701/72 |
| 5,832,402 | * 11/1998 | Brachert et al. | 701/72 |
| 5,987,364 | * 11/1999 | Le Gusquet | 701/24 |

FOREIGN PATENT DOCUMENTS

| 195 10 525 | 9/1996 | (DE) . |
| 195 25 217 | 1/1997 | (DE) . |
| 196 36 443 | 3/1998 | (DE) . |
| 0 387 384 | 9/1990 | (EP) . |
| 0 751 888 | 3/1995 | (EP) . |
| 98 10297 | 3/1998 | (WO) . |

OTHER PUBLICATIONS

"Normalized Measurement Comparison Means for Automotive Powertrain(PT)/Chassis Systems' Angular Speed Sensor and/or PT Mechanical Slip Diagnostics," Research Disclosure, No. 352, Aug. 1, 1993, p. 504.*

Zanten Van A. et al., "FDR–Die Fahrdynamik–Regelung von Bosch", ATZ Automobiltechnische Zeitschrift, vol. 96, No. 11, Nov. 1, 1994, pp. 674–678, 683–689.*

* cited by examiner

Primary Examiner—William A. Cuchlinski, Jr.
Assistant Examiner—Gertrude Arthur
(74) Attorney, Agent, or Firm—Kenyon & Kenyon

(57) ABSTRACT

A device to monitor sensors in a motor vehicle, with the sensors generating signals that each represent different physical variables is provided. The device has a first arrangement with which identically defined comparison variables for the sensors are determined for at least two sensors on the basis of at least the signals generated by them. Furthermore, the device has a second arrangement with which monitoring is performed for at least one sensor, with the monitoring being performed at least as a function of a sensor reference variable determined for the sensor, the signal generated with the sensor and a respective threshold value. In addition, this device has a second arrangement with which a variable is determined at least as a function of at least two of the identically defined comparison variables and is taken into account in forming the threshold value.

12 Claims, 2 Drawing Sheets

METHOD AND DEVICE FOR MONITORING SENSORS IN A VEHICLE

FIELD OF THE INVENTION

The present invention relates to a device and a method for monitoring sensors used in a motor vehicle. In particular, the device and the method are for monitoring sensors used in a system for regulating the driving dynamics of a motor vehicle.

BACKGROUND INFORMATION

Devices and methods for monitoring sensors used in a vehicle are described in the related art in a variety of versions.

German Patent Application No. P 196 36 443 describes a method and a device for monitoring sensors in a vehicle. With this method and device, sensors, each of which represent different physical parameters, are monitored. The device contains means with which identically defined comparison variables are determined for at least two sensors on the basis of at least the signals they generate. This device also contains other means with which one reference variable is determined as a function of at least the determined comparison variables. On the basis of this reference variable, a sensor reference variable is determined for each of the individual sensors. This patent application describes, among other things, monitoring of a yaw rate sensor. Monitoring of yaw rate sensors is composed of several plausibility queries. For example, a query is performed for the yaw rate sensor, with the value of the signal generated with the help of the yaw rate sensor and the sensor reference variable generated entering into this query. To do so, a difference between the value of the signal generated with the help of the yaw rate sensor and the respective sensor reference variable is formed and compared with a respective threshold value. The following variables enter into the formation of this threshold value:

The value of the signal generated with the help of the yaw rate sensor, the identically defined comparison variable for a steering angle sensor, the value of the signal generated with the help of the steering angle sensor, a variable describing longitudinal velocity of the vehicle and a variable for the yaw rate, which takes into account the effects of transversely slanting road surfaces.

Systems for regulating the driving dynamics of a vehicle are known, for example, from the article "FDR-die Fahrdynamik-Regelung von Bosch" (Regulating Drive Mechanics—the Bosch Method) published in the automotive engineering journal *Automobiltechnische Zeitschrift* (ATZ), volume 16, number 11 (1994) pages 674 through 689.

SUMMARY OF THE INVENTION

An object of the present invention is to improve upon the monitoring of sensors used in a vehicle.

The present invention permits monitoring of sensors that generate signals representing different physical variables. For at least two sensors, identically defined comparison variables are advantageously determined for the sensors on the basis of at least the signals they generate. Monitoring is performed for at least one sensor, with the monitoring preferably being performed in accordance with a sensor reference variable determined for the sensor, the signal generated with the sensor and a respective threshold value.

The advantage of the present invention in comparison with conventional devices is that with the device and the method according to the present invention for monitoring sensors used in a vehicle, a variable that is taken into account in performing the monitoring of the at least one sensor is determined at least on the basis of at least two of the identically defined comparison variables.

Furthermore, it is advantageous that a predefined variable, which is independent of the identically defined comparison variables, enters into formation of the threshold value. The threshold value here is advantageously obtained as a sum of the variable formed at least on the basis of at least two of the identically defined comparison variables and the predefined variable which is independent of the identically defined comparison variables.

The variable taken into account in forming the threshold value advantageously describes the difference between the at least two identically defined comparison variables. In forming this variable, the identically defined comparison variable of the sensor monitored with the help of this device is preferably disregarded. To form the variable describing the difference between the at least two identically defined comparison variables, it is advantageous to determine, on the basis of each of the at least two identically defined comparison variables, a variable describing the difference between this identically defined comparison variable and the others of the at least two identically defined comparison variables.

Forming the threshold value in the manner described above yields the following advantage:

Due to the fact that a variable determined at least on the basis of at least two of the identically defined comparison variables enters into formation of the threshold value, the scattering in the identically defined comparison variables also enters into forming the threshold value. If the identically defined comparison variables yield a good match, then the at least one sensor can be monitored for a low threshold value, i.e., for very narrow tolerances. This monitoring is independent of the driving situation. However, if there are great fluctuations between the identically defined comparison variables that are attributable to model inaccuracies depending on the driving situation or to sensor signals subject to a tolerance, then this requires a corresponding increase in the threshold value or a corresponding broadening of the monitoring tolerances.

Another advantage is derived due to the fact that the variable taken into account in forming the threshold value is filtered.

The sensor reference variable needed to perform the monitoring of the at least one sensor is advantageously formed at least on the basis of the identically defined comparison variables. Furthermore, it is advantageous that the signal generated with the sensor is offset-corrected for monitoring the at least one sensor. The absolute value of the difference between the offset-corrected signal and the sensor reference variable is compared with the respective threshold value.

It has proven advantageous for a variable to be implemented in the form of a counter for monitoring the at least one sensor. The variable is incremented when the absolute value of the difference formed from the offset-corrected signal and the sensor reference variable is greater than the threshold value. The variable is decremented when said absolute value of the difference is less than the threshold value. The at least one sensor is defective when this variable is greater than a second threshold value.

The identically defined comparison variables advantageously represent a physical variable which preferably corresponds to a variable, in particular a yaw rate, detected with one of the sensors present in the vehicle.

DETAILED DESCRIPTION

The present invention will now be described with reference to FIGS. 1 and 2.

The specific form of the selected embodiment—using the device and the method according to the present invention in a system for regulating the driving dynamics of a vehicle—should in no way restrict the idea according to the present invention.

Figure 1:
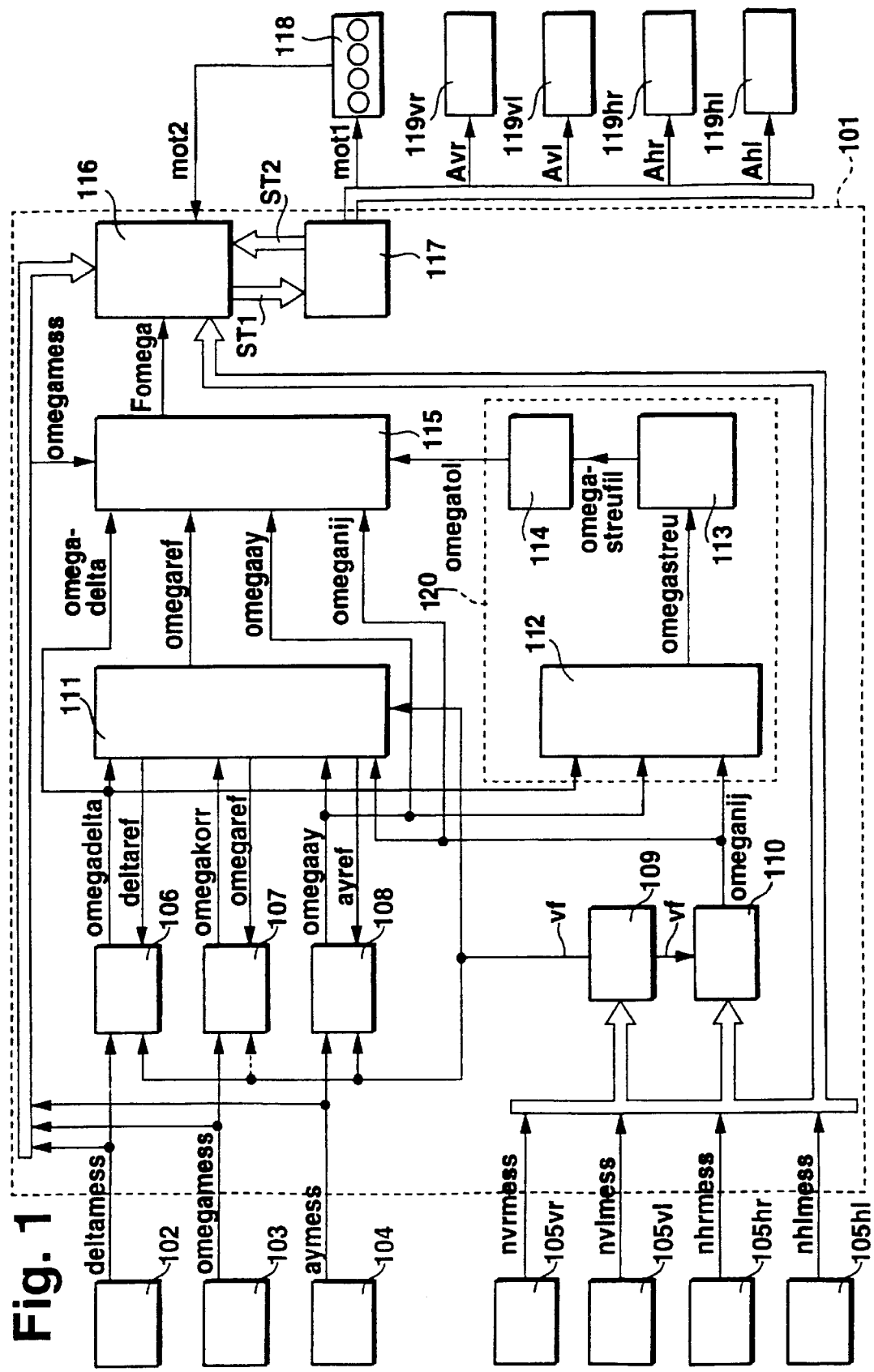
FIG. 1 illustrates a device for implementing a method according to the present invention.

FIG. 1 shows block 101 as a control unit, which is used in the device according to the present invention to carry out the method according to the present invention.

A steering angle sensor 102 can detect a quantity deltamess describing a steering angle set on the vehicle. Signal deltamess generated with the help of steering angle sensor 102 is sent to a block 106 as well as a block 116. With the help of a rotational rate sensor or yaw rate sensor 103, a variable is obtained that describes the yawing motion of the vehicle about its vertical axis. Signal omegamess detected with the help of rotational rate sensor or yaw rate sensor 103 is sent to a block 107 as well as a block 115 and a block 116. A variable describing transverse acceleration acting on the vehicle is detected with a transverse acceleration sensor 104.

Signal aymess generated with the help of transverse acceleration sensor 104 is sent to blocks 108 and 116. Blocks 105vr, 105vl, 105hr and 105hl represent wheel rpm sensors assigned to each wheel of the vehicle. Hereinafter, simplified notation 105ij is introduced below for these wheel rpm sensors. Index i indicates whether the wheel is on the rear axle (h) or front axle (v). Index j indicates the assignment to the right (r) or left (l) side of the vehicle. This notation using two indices i and j is the same for all variables and components used here. Signals nijmess generated with the help of wheel rpm sensors 105ij are sent to blocks 109, 110 and/or 116.

On the basis of signals nijmess generated using wheel rpm sensors 105ij, a variable vf describing the vehicle speed is generated in a block 109. This variable vf describing the vehicle speed is sent from block 109 to blocks 106, 108, 110 and a block 111. Variable vf may optionally also be sent to block 107.

Identically defined comparison variables are determined for sensors 102, 103, 104 and 105ij in blocks 106, 107, 108 and 110. In the present embodiment, it shall be assumed that the identically defined comparison variables for the sensors represent a yaw rate as a physical variable.

In a block 106, an identically defined comparison variable omegadelta is determined on the basis of signal deltamess supplied to that block as well as variable vf describing the vehicle speed and variable deltaref supplied to the block. Identically defined comparison variable omegadelta is sent from block 106 to blocks 111, 112 and 115. Identically defined comparison variable omegadelta is determined in block 106, for example, as follows:

First, an offset value for signal deltamess is determined on the basis of signal deltamess, variable vf describing the vehicle speed and a signal deltaref describing a reference value for the steering angle detected with the help of steering angle sensor 102. Signal deltamess is corrected on the basis of the offset value thus determined. With the help of a mathematical model, identically defined comparison variable omegadelta is determined from the corrected signal, taking into account variable vf describing the vehicle speed.

Identically defined comparison variable omegaay is determined in block 108 on the basis of signals aymess, vf and ayref sent to that block in a manner similar to the determination of identically defined comparison variable omegadelta in block 106. Identically defined comparison variable omegaay is sent to a block 111 as well as to blocks 112 and 115.

The identically defined comparison variables for the sensors represent a yaw rate as a physical variable, as already mentioned, so identically defined comparison variable omegakorr determined in block 107 corresponds to offset-corrected signal omegamess, because in this case no conversion of the offset-corrected sensor signal to a yaw rate with the help of a mathematical model is necessary. As described previously with regard to blocks 106 and 108, an offset value for signal omegamess is determined in block 107 on the basis of signal omegamess as well as variable omegaref. Identically defined comparison variable omegakorr is calculated from signal omegamess with the help of this offset value. Variable omegakorr is sent to a block 111.

For the case when the identically defined comparison variables for the sensors represent a variable other than the yaw rate as a physical variable, the offset-corrected signal must also be converted in block 107 with the help of a mathematical model. For this reason, variable vf describing the vehicle speed as indicated is sent to block 107.

In a block 110, an identically defined comparison variable omeganij is determined for wheel rpm sensors 105ij on the basis of signals nijmess generated with the help of wheel rpm sensors 105ij as well as variable vf representing the vehicle speed. Identically defined comparison variable omeganij is sent from block 110 to blocks 111, 112 and 115.

Two processes take place in block 111. First, a reference variable omegaref is determined in block 111 on the basis of identically defined comparison variables omegadelta, omegakorr, omegaay and omeganij sent to that block. One method of determining reference variable omegaref, for example, is to first determine the identically defined comparison variable that differs from the reference variable determined last by the greatest amount. Since this comparison variable differs from the reference variable determined last by the greatest amount, it can be concluded that under some circumstances the respective sensor might be defective. Consequently, this comparison variable is disregarded in determining the new reference variable. The new reference variable is formed by forming a weighted average. The remaining comparison variables and also the differences between the remaining comparison variables enter into forming the weighted average. Reference variable omegaref is sent to a block 115.

In addition, sensor reference variables for sensors 102, 103 and 104 are determined in block 111. These sensor reference variables are determined with the help of inverse mathematical models on the basis of reference variable omegaref, taking into account variable vf describing the vehicle speed. Sensor reference variable deltaref which is determined for sensor 102, the steering angle sensor, is sent from block 111 to block 106. Sensor reference variable omegaref which is used for sensor 103, the rotational rate sensor or yaw rate sensor, is sent from block 111 to block

107. Sensor reference variable ayref which is determined for sensor 104, the transverse acceleration sensor, is also sent from block 111 to block 108. Variable ayref is determined like deltaref.

A variable omegastreu is determined in a block 112 on the basis of identically defined comparison variables omeganij, omegaay and omegadelta; variable omegastreu is taken into account in forming a threshold value which is itself taken into account in the monitoring of rotational rate sensor or yaw rate sensor 103 which takes place in block 115. Variable omegastreu is sent from block 112 to a block 113.

Since rotational rate sensor or yaw rate sensor 103 is to be monitored with the help of the monitoring that takes place in block 115, identically defined comparison variable omegakorr, which is determined for rotational rate sensor or yaw rate sensor 103, is disregarded in determining variable omegastreu in block 112. In other words, only the identically defined comparison variables of the other sensors enter into variable omegastreu, i.e., the identically defined comparison variable of steering angle sensor 102, the identically defined comparison variable of transverse acceleration sensor 104 and the identically defined comparison variable of wheel rpm sensors 105$ij$ enter into that variable. Identically defined comparison variable omegakorr of rotational rate sensor or yaw rate sensor 103 is disregarded in forming variable omegastreu for the following reason:

If identically defined comparison variable omegakorr were taken into account in forming variable omegastreu, and if a rotational rate sensor or yaw rate sensor 103 were defective, this could lead to a falsification of variable omegastreu which would also affect the threshold value for the monitoring of rotational rate sensor or yaw rate sensor 103 performed in block 115. In this event, it would be conceivable for a defective sensor to go undetected in the monitoring of rotational rate sensor or yaw rate sensor 103 performed in block 115.

Variable omegastreu is determined, for example, on the basis of identically defined comparison variables omegadelta, omegaay and omeganij according to the following equations:

$$omegastreu = \frac{1}{GEW2 + GEW3 + GEW4}, \quad (1)$$

where $$GEW2 = \frac{1}{|omegadelta - omeganij| \cdot |omegadelta - omegaay|}, \quad (2)$$

$$GEW3 = \frac{1}{|omegadelta - omeganij| \cdot |omeganij - omegaay|}, \quad (3)$$

$$GEW4 = \frac{1}{|omegadelta - omegaay| \cdot |omeganij - omegaay|}. \quad (4)$$

As indicated by equations (1), (2), (3) and (4), only a portion of the identically defined comparison variables are used to form variable omegastreu describing the difference between the identically defined comparison variables. For this portion of the identically defined comparison variables, variables GEW2, GEW3 and GEW4 are variables describing, for each of these identically defined comparison variables of this portion of identically defined comparison variables, the difference between this identically defined comparison variable and the other identically defined comparison variables of this portion of these identically defined comparison variables. Variable omegastreu describes the difference between the identically defined comparison variables.

Variable GEW2 is formed for identically defined variable omegadelta; variable GEW3 is formed for identically defined variable omeganij; and variable GEW4 is formed for identically defined variable omegaay. Equations (1) through (4) have been formulated so that variable omegastreu becomes smaller as the match between identically defined comparison variables becomes better. In particular, variable omegastreu assumes a small value with two identically defined comparison variables that are approximately equal.

Variable omegastreu which is sent from block 112 to block 113 is filtered in the latter. Filtered variable omegastreufil is sent from block 113 to block 114.

The filtering performed in block 113 eliminates fluctuations in variable omegastreu that can occur due to the modeling performed in the various blocks.

Threshold value omegatol, which is formed in block 114 on the basis of variable omegastreufil sent to that block, is needed for the monitoring of rotational rate sensor or yaw rate sensor 103 performed in block 115. Variable omegastreufil is sent from block 114 to a block 115.

In block 114, threshold value omegatol is formed on the basis of variable omegastreufil as well as a predefined variable that is independent of the identically defined comparison variables. Threshold value omegatol is formed, for example, as the sum of variable omegastreufil and the predefined variable which is independent of the identically defined comparison variables. The predefined variable which is independent of the identically defined comparison variables represents a basic tolerance for threshold value omegatol. It is predefined essentially by the sensor specifications and the insensitivity of regulator 116, implemented in control unit 101, to errors occurring in the signal from rotational rate sensor or yaw rate sensor 103, which is to be processed in said regulator. In comparison with the predefined variable which is independent of the identically defined comparison variables, variable omegastreufil represents a dynamic broadening of tolerance as a function of identically defined comparison variables omegadelta, omegaay and omeganij. Variable omegastreufil can be weighted appropriately in the summation performed in block 114, so that the scattering which always occurs in practice, e.g., due to irregularities in road surface or incompletely compensated sensor offsets, will not cause any unnecessary broadening of threshold value omegatol.

Rotational rate sensor or yaw rate sensor 103 is monitored in block 115 on the basis of variables omegadelta, omegaref, omegaay, omeganij and signal omegamess generated with the help of rotational rate sensor 105 and threshold value omegatol. The result of this monitoring is output with the help of variable Fomega and sent to a block 116. Implementation of the monitoring of rotational rate sensor or yaw rate sensor 103 performed in block 115 is discussed in detail in conjunction with FIG. 2.

It should be pointed out here that only the monitoring of rotational rate sensor or yaw rate sensor 103 is shown in the present embodiment. Corresponding monitoring may of course also be implemented for steering angle sensor 102 and for transverse acceleration sensor 104. Blocks corresponding to blocks 112, 113, 114 and 115 are necessary for monitoring of steering angle sensor 102 as well as transverse acceleration sensor 104. It should be noted here, however, that in monitoring steering angle sensor 102, identically defined comparison variable omegadelta is disregarded in forming the corresponding threshold value. Furthermore signal deltamess is to be taken into account instead of signal omegamess in monitoring steering angle sensor 102. In monitoring transverse acceleration sensor 104, identically defined comparison variable omegaay for the transverse acceleration sensor is disregarded in forming the corresponding threshold value. Instead of signal omegamess, signal aymess is taken into account in monitoring transverse acceleration sensor 104.

Block 116 is the regulator of control unit 101. Test signals deltamess, omegamess, aymess and nijmess are sent to block 116. Furthermore, block 116 receives from engine 118 a signal mot2 describing the engine rpm, for example. In addition, block 116 receives signals ST2 from a block 117 which is the control logic for actuators 119*ij* and the engine. These signals may be, for example, control times Aij of the actuators, which are designed as brakes in particular. On the basis of the test signals, signals ST2, and variable Fomega, regulator 116 determines signals ST1 in accordance with the regulation implemented in it, the latter signals being sent to control logic 117. If regulator 116 is informed by signal Fomega that rotational rate sensor or yaw rate sensor 103 is defective, formation of signals ST1 can be modified.

A control signal mot1 for engine 118 and control signals Aij for actuators 119*ij* are determined in block 117 on the basis of signals ST1 sent to that block. Regulation of a motion variable representing the motion of the vehicle is implemented through the corresponding control of engine 118 as well as actuators 119*ij*, which are implemented in the form of brakes in particular. Regulator 116 is informed of the status of actuators 119*ij*, for example, with signals ST2 generated in block 117.

In conclusion, it should be pointed out with regard to FIG. 1 that the components essential to the present invention are labeled with reference number 120.

Figure 2:
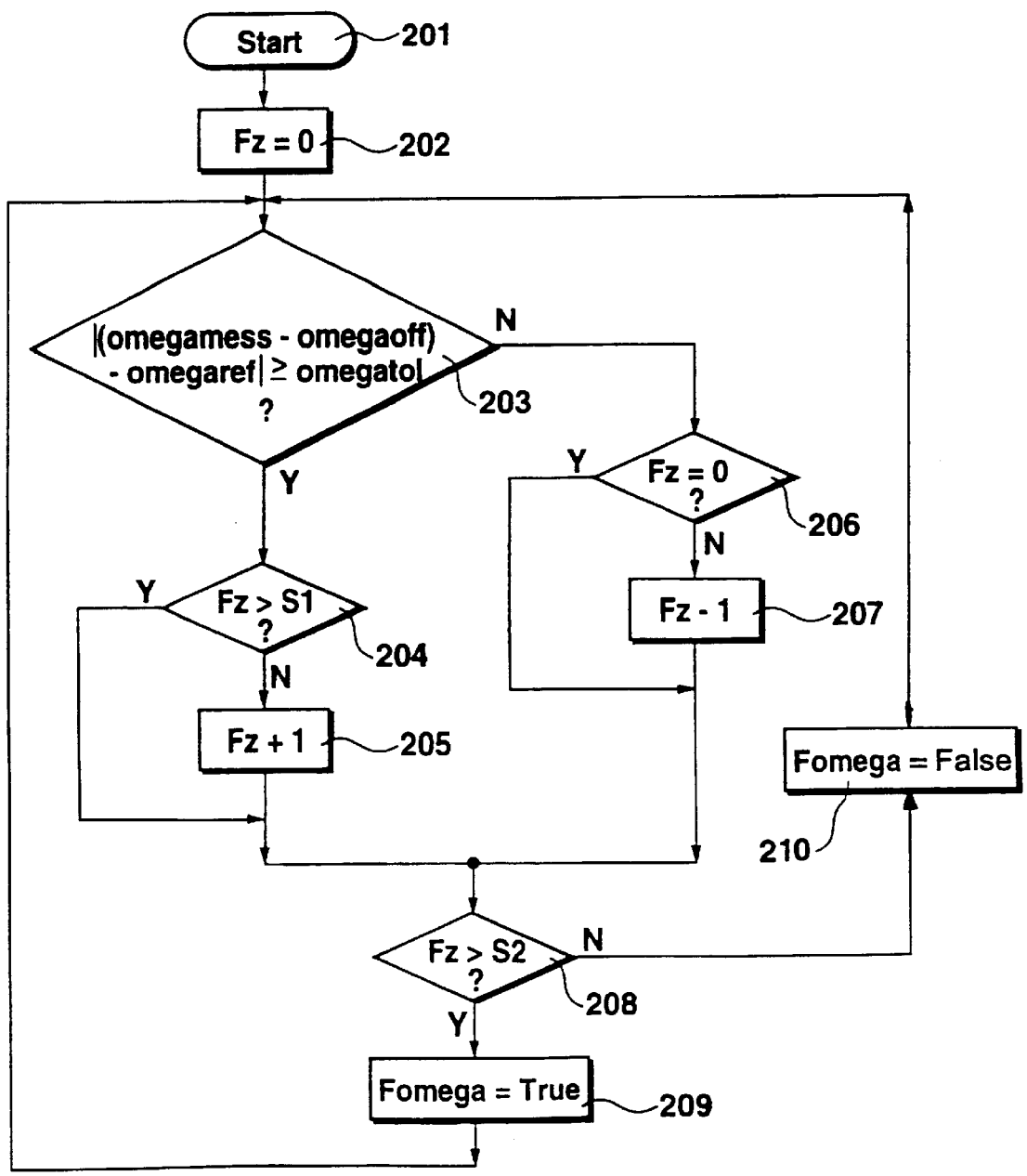
FIG. 2 illustrates a flow chart for part of the monitoring performed on a rational rate sensor or a yaw rate sensor.

FIG. 2 shows the portion of the monitoring of rotational rate sensor or yaw rate sensor 103 performed in block 115 that is essential to the present invention. Monitoring of rotational rate sensor or yaw rate sensor 103 begins with a step 201. Step 201 is followed by a step 202, where a variable FZ representing a counter is assigned a value of 0. The value assignment performed in step 202 is an initialization process, such as that performed when operating an ignition key, for example. Then a step 203 is performed after step 202.

For the query performed in step 203, first a difference between variable omegamess and a variable omegaoff is formed. The absolute value of a difference formed from said difference and reference variable omegaref is compared with threshold value omegatol. If this difference is equal to or greater than threshold value omegatol, which would indicate a defective rotational rate sensor or yaw rate sensor, a step 204 is performed after step 203. However, if this difference is less than threshold value omegatol, which would be equivalent to rotational rate sensor or yaw rate sensor not being defective, then a step 206 is performed after step 203.

Variable omegaoff is the offset of signal omegamess generated with the help of the rotational rate sensor or yaw rate sensor. Variable omegaoff is obtained in block 115 on the basis of signal omegamess, e.g., by filtering. Consequently, the difference between signals omegamess and omegaoff is the offset-corrected signal generated with the help of rotational rate sensor or yaw rate sensor 103.

With the help of a query, step 204 determines whether variable FZ is greater than a first threshold value S1. If variable FZ is greater than first threshold value S1, step 208 is performed after step 204. However, if variable FZ is less than first threshold value S1, then a step 205 is performed following step 204 and variable FZ is incremented by 1. A step 208 is performed after step 205. First threshold value S1 is a positive value.

It should be pointed out here that an upper limit is set for variable FZ on the basis of the comparison of variable FZ with threshold value S1 performed in step 204.

Step 206 determines whether variable FZ is equal to zero. If it is found in step 206 that variable FZ is equal to zero, then a step 208 is performed following step 206. However, if it is found in step 206 that variable FZ is not equal to zero then a step 207 is performed following step 206. Variable FZ is decremented by 1 in step 207. A step 208 is performed following step 207.

Step 208 determines whether variable FZ is greater than a second threshold value S2. Second threshold value is also a positive value. It should be pointed out here that first threshold value S1 is selected to be greater than second threshold value S2. If it is found in step 208 that variable FZ is greater than second threshold value S2, which would be equivalent to rotational rate sensor or yaw rate sensor 103 being defective, a step 209 is carried out following step 208. The value TRUE is assigned to variable Fomega in step 209, because it has been found in step 208 that rotational rate sensor or yaw rate sensor 103 is defective. Step 203 is performed following step 209.

However, if it is found in step 208 that variable FZ is not greater than second threshold value S2, which would be equivalent to rotational rate sensor or yaw rate sensor 103 not being defective, then a step 210 is performed following step 208. The value FALSE is assigned to variable Fomega in step 210, because rotational rate sensor or yaw rate sensor 103 is not defective. Step 203 is performed following step 210.

It should be pointed out here that these two threshold values S1 and S2 need not necessarily have different values. It may also be quite advantageous if both threshold values have the same value.

As already mentioned with regard to FIG. 1, the monitoring of rotational rate sensor or yaw rate sensor 103 described in the embodiment should not have any restrictive effect. Steering angle sensor 102 and/or transverse acceleration sensor 104 can also be monitored with the help of the device and the method according to the present invention. To do so, a modification of the monitoring performed in step 203 is necessary for the respective sensors. For example, for steering angle sensor 102, the absolute value is formed from signal deltamess and a variable deltaoff, and variable deltaref is taken into account instead of variable omegaref. For transverse acceleration sensor 104, the absolute value is determined from variable aymess and a variable ayoff, and variable ayref is taken into account instead of variable eomegaref.

It should be pointed out here that the monitoring of rotational rate sensor or yaw rate sensor 103 illustrated in FIG. 2 is performed when the mathematical models or inverse mathematical models used in the various blocks are valid. The same thing is also true of any monitoring of the steering angle sensor and/or the transverse acceleration sensor.

In addition to the monitoring of rotational rate sensor or yaw rate sensor 103 illustrated in FIG. 2, additional monitoring of rotational rate sensor or yaw rate sensor 103 is performed in block 115 on the basis of identically defined comparison variables omegadelta, omegaay, omeganij plus a variable omegakorr1 formed from signal omegamess. In this connection, variable omegakorr1 represents offset-corrected signal omegamess which is determined by long-term filtering, for example.

This second monitoring is performed regardless of the validity of the mathematical models or inverse mathematical models used in the various blocks. In this second monitoring, a check is performed with the help of a first query to determine whether the three identically defined comparison variables are within a narrow yaw rate band for a certain period of time. A second query determines whether offset-corrected value omegakorr1 differs from the three identically defined comparison variables by a minimum amount for a certain period of time. It is tentatively surmised that rotational rate sensor or yaw rate sensor 103 is defective if the first query shows that the three identically defined comparison variables are within a narrow yaw rate band for a certain period of time, and if the second query finds that offset-corrected variable omegakorr1 differs from the three identically defined comparison variables by a minimum amount for a certain period of time. However, if one of the two queries yields a negative finding, it is not tentatively surmised that the rotational rate sensor or yaw rate sensor is defective. If rotational rate sensor or yaw rate sensor 103 is defective, variable Fomega is assigned the value TRUE. However, if rotational rate sensor or yaw rate sensor 103 is not defective, variable Fomega is assigned the value FALSE.

In conclusion, it should also be pointed out that the specific embodiment of the flow chart shown in FIG. 2 should not have any restrictive effect on the scope of the present invention.

What is claimed is:

1. A device for monitoring sensors in a motor vehicle, each of the sensors generating signals representing different physical variables, the system comprising:
   a first arrangement determining identically defined comparison variables for at least two of the sensors at least as a function of the signals generated by the at least two of the sensors;
   a second arrangement monitoring at least one of the sensors at least as a function of a sensor reference variable determined for the at least one of the sensors, the signals generated by the at least one of the sensors, and a respective threshold value; and
   a third arrangement determining a first variable at least as a function of at least two of the identically defined comparison variables, the respective threshold value being formed as a function of the first variable.

2. The device according to claim 1, wherein the identically defined comparison variables include a physical variable, the physical variable corresponding to a yaw rate detected by one of the sensors.

3. The device according to claim 1, wherein the first variable describes a difference between the at least two identically defined comparison variables.

4. The device according to claim 3, wherein the identically defined comparison variable of the at least one of the sensors is disregarded in determining the first variable.

5. The device according to claim 4, wherein the first variable is determined as a function of second variable, the second variable describing a difference between the identically defined comparison variable of the at least one of the sensors and the others of the at least two identically defined comparison variables.

6. The device according to claim 3, wherein the first variable is determined as a function of second variable, the second variable describing a difference between the identically defined comparison variable of the at least one of the sensors and the others of the at least two identically defined comparison variables.

7. The device according to claim 1, wherein the third arrangement includes a filter, the filter filtering the first variable.

8. The device according to claim 1, wherein the sensor reference variable is formed as a function of the identically defined comparison variables.

9. A device for monitoring sensors in a motor vehicle, each of the sensors generating signals representing different physical variables, the system comprising:
   a first arrangement determining identically defined comparison variables for at least two of the sensors at least as a function of the signals generated by the at least two of the sensors;
   a second arrangement monitoring at least one of the sensors at least as a function of a sensor reference variable determined for the at least one of the sensors, the signals generated by the at least one of the sensors, and a respective threshold value; and
   a third arrangement determining a first variable at least as a function of at least two of the identically defined comparison variables, the respective threshold value being formed as a function of the first variable, wherein the threshold value is a sum of the first variable and a predefined variable, the predefined variable being independent of the identically defined comparison variables.

10. A device for monitoring sensors in a motor vehicle, each of the sensors generating signals representing different physical variables, the system comprising:
   a first arrangement determining identically defined comparison variables for at least two of the sensors at least as a function of the signals generated by the at least two of the sensors;
   a second arrangement monitoring at least one of the sensors at least as a function of a sensor reference variable determined for the at least one of the sensors, the signals generated by the at least one of the sensors, and a respective threshold value; and
   a third arrangement determining a first variable at least as a function of at least two of the identically defined comparison variables, the respective threshold value being formed as a function of the first variable, wherein the signal generated by the at least one of the sensors is offset-corrected, and a difference between the offset-corrected signal and the sensor reference variable is determined, an absolute value of the difference being compared with the threshold value.

11. The device according to claim 10, wherein a third variable acts as a counter for monitoring the at least one of the sensors, the third variable being incremented when the absolute value is greater than the threshold value, the third variable being decremented when the absolute value is less than the threshold value, the at least one of the sensors being defective if the third variable is greater than a second threshold value.

12. A method of monitoring sensors in a vehicle, comprising the steps of:
   generating signals by the sensors, each of the signals representing different physical variables;
   determining identically defined comparison variables for at least two of the sensors as a function of the signals generated by the at least two of the sensors;
   monitoring at least one of the sensors, the monitoring being performed at least as a function of a sensor reference variable, the signal generated by the at least one of the sensors, and a threshold value; and
   determining a first variable at least as a function of at least two of the identically defined comparison variables, the threshold value being a function of the first variable.

* * * * *

UNITED STATES PATENT AND TRADEMARK OFFICE
CERTIFICATE OF CORRECTION

PATENT NO.    : 6,253,130 B1
DATED         : June 26, 2001
INVENTOR(S)   : Mergenthaler, Rolf-Hermann et al.

It is certified that error appears in the above-identified patent and that said Letters Patent is hereby corrected as shown below:

<u>Title page,</u>
Item [57], ABSTRACT,
Line 12, change "second" to -- third --

<u>Column 8,</u>
Line 51, change "eomegaref" to -- omegaref --

Signed and Sealed this

Third Day of December, 2002

JAMES E. ROGAN
*Director of the United States Patent and Trademark Office*